April 9, 1968  H. L. WOOD  3,377,096
VACUUM GRIPPING PAD
Filed June 2, 1967  2 Sheets-Sheet 1

Howard L. Wood
INVENTOR.

BY Clarence A. O'Brien
and Harvey B. Jacobson
Attorneys

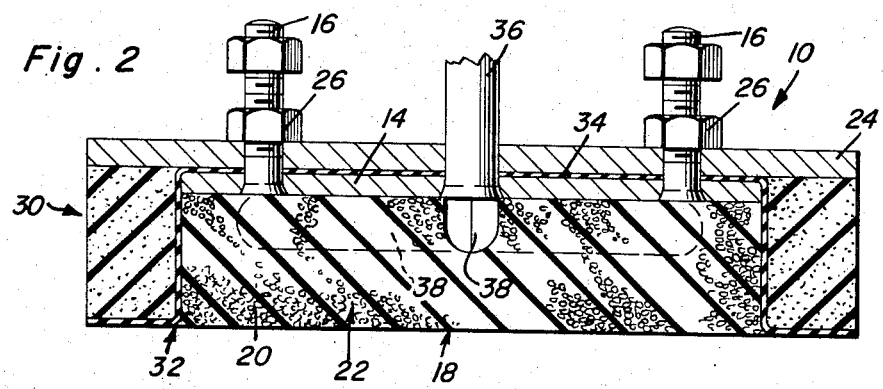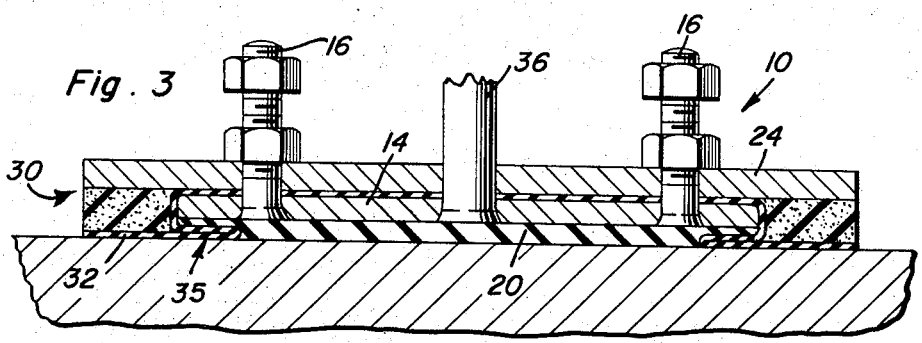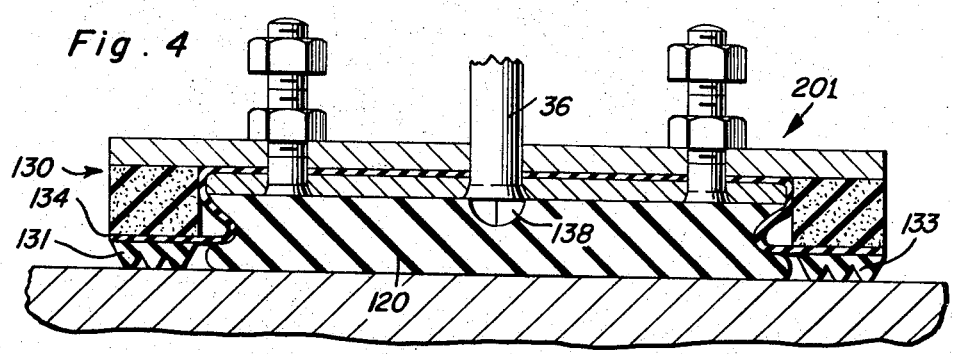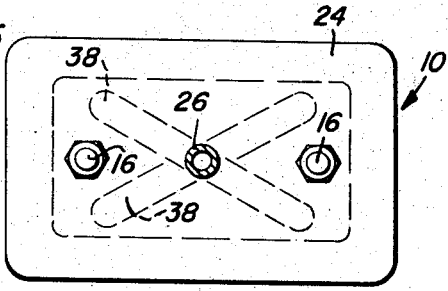
Howard L. Wood
INVENTOR.

United States Patent Office 3,377,096
Patented Apr. 9, 1968

3,377,096
VACUUM GRIPPING PAD
Howard L. Wood, Wolf Point, Mont., assignor to Wood's Powr-Grip Co., Inc., a corporation of Montana
Filed June 2, 1967, Ser. No. 643,210
11 Claims. (Cl. 294—64)

ABSTRACT OF THE DISCLOSURE

A vacuum gripping pad construction having a body member comprising a means for attachment of an external force which body member overlies an open celled, collapsible, foamed type flexible material provided with a peripheral flexible film seal means to provide a vacuum gripping pad of desired utility.

---

The present invention relates to vacuum gripping devices and more particularly to vacuum gripping pad devices adapted for attachment to relatively non-porous surfaces of both planar and non-planar configuration. More particularly, the present invention relates to a vacuum gripping pad device which upon evacuation of a substantial portion of the air normally contained therein collapses to form a generally solid relatively rigid pad secured by a force determined by the area of the gripping pad body and atmospheric pressure.

Inasmuch as gripping devices employing a vacuum principal have been previously known, the present invention incorporates novel structural features therein so as to provide an improved gripping pad device for the securing of utilitarian devices to relatively non-porous surfaces of both planar and non-planar configuration.

Another object of the present invention is to provide a novel vacuum gripping pad device having a generally rigid frame means adapted for connection to an external lifting means on one side thereof and on the opposed side thereof being provided with a peripheral seal and evacuation chamber within which chamber is secured a resilient filling of a porous material such as an open or continuous cell flexible, collapsible material which upon evacuation of the fluid within the cells thereof collapses to form a relatively solid, relatively rigid differential pressure secured pad.

Another object of the present invention is to provide a novel construction for a vacuum gripping pad device utilizing an open celled resilient foam vacuum gripping pad adapted to assume, upon evacuation to a partial internal pressure, a generally solid, generally rigid configuration which assists in resisting external forces tending to dislodge the vacuum gripping device in a line generally parallel to the plane of attachment of the device to a generally non-porous surface.

A further object of the present invention is to provide a novel construction for a vacuum gripping pad wherein an open celled resilient foam vacuum gripping pad is provided with a peripheral seal means on all but the gripping surface thereof so as to substantially preclude the inadvertent equalization of pressure differential existing between the evacuated vacuum gripping pad and the atmosphere surrounding the vacuum lifting device.

Still another object of the present invention is to provide an improved construction for a vacuum gripping device wherein the gripping device may be secured to or utilized to grip generally non-porous surfaced articles of non-planar as well as planar configuration.

Still a further object of the present invention is to provide an improved construction for a vacuum gripping pad device including a vacuum gripping pad comprising an open celled resilient foam material provided with evacuation accelerating means connecting the non-porous vacuum gripping surface of the open celled foam with means of evacuating the fluid within the open celled foam so as to rapidly permit the establishment of a pressure differential whereby the vacuum gripping device may be rapidly secured to and/or removed from a relatively non-porous surface.

Still a further object of the present invention is to provide a novel vacuum gripping device of the aforementioned type wherein the open celled foam gripping pad includes a peripheral seal means comprising a substantially air impervious flexible film substantially sealing all but the gripping surface of the vacuum gripping pad so as to provide an effective seal between the vacuum gripping pad and a peripheral compressible sealing border disposed outwardly of and generally contiguous to the vacuum gripping pad.

These together with other objects and advantages which will become subsequently apparent reside in the details of construction and operating as more fully hereinafter described and claimed, reference being had to the accompanying drawings forming a part hereof, wherein like numerals refer to like parts throughout, and in which:

FIGURE 2 is an enlarged longitudinal vertical cross-sectional view taken through the medial portion of the device of FIGURE 1, further showing the device prior to the evacuation of the fluid in the open cell vacuum gripping pad;

Figure 1:
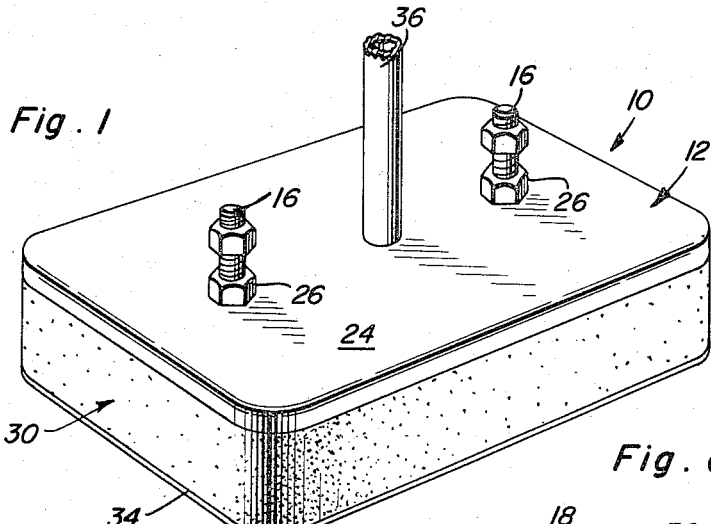
FIGURE 1 is a perspective view of an exemplary embodiment of a vacuum gripping pad produced in accordance with the principles of the present invention.
Figure 6:
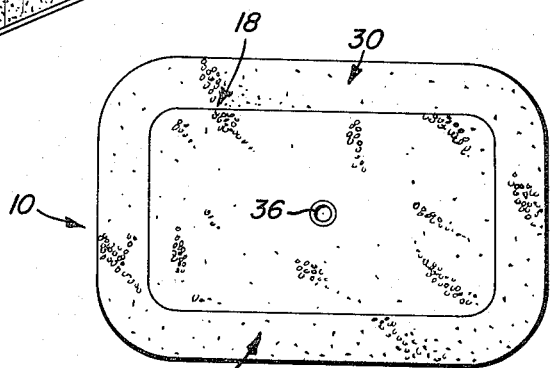
Figure 7:
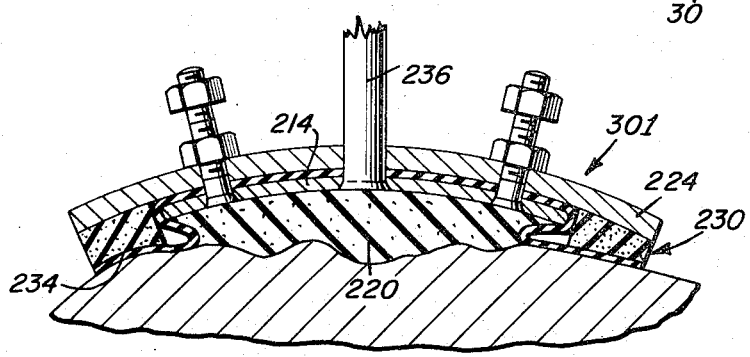

FIGURE 3 is a vertical cross-sectional view taken along substantially the same plane as FIGURE 2 showing the device of FIGURE 1 subsequent to evacuation of a substantial portion of the fluid normally contained within the cells of the open celled resilient foam gripping pad, further showing the manner in which the open celled resilient foam filling material collapsed to form a substantially solid relatively rigid member;

FIGURE 4 is a modified form of the vacuum gripping device of FIGURES 1-3 wherein the sealing lip includes a ribbed seal member which may be modified into other known seal assists and seal protective forms:

FIGURE 5 is a top plan view, in reduced scale, of the vacuum gripping pad device of FIGURE 1, further showing in phantom lines the outline of the open celled resilient foam vacuum gripping pad therein and the positioning of the evacuation enhancing channels on the upper surface thereof which communicate with a fluid evacuation conduit;

FIGURE 6 is a bottom plan view, in reduced scale, of the vacuum gripping pad device of FIGURE 1; and FIGURE 7 is another embodiment of a vacuum gripping device constructed in accordance with the principles of the present invention which device is primarily adapted for utilization with convex or irregular-convex generally non-porous surfaced articles and the like.

Referring now to the drawings and particularly the embodiment of the invention illustrated in FIGURES 1-3, 5 and 6 it will be seen that the embodiment of a vacuum gripping device indicated generally at 10 comprises a substantially rigid frame means indicated generally at 12 and comprising a generally planar rigid plate 14 such as of metal, plastic, wood or the like adapted to provide both support for the remaining elements of the vacuum gripping device 10 and a means of connecting the vacuum gripping device 10 to an external force such as a cable, handle, or the like secured to the plate 14 by means of fasteners 16 such as threaded bolts or the like secured to the plate 14 in a manner to be described hereinafter.

The vacuum gripping device 10 relies upon a vacuum gripper pad means indicated generally at 18 for its improved lifting characteristics. In this regard, it will be seen that the vacuum gripper pad means 18 includes a gripper pad 20 formed of an open celled foam material, such as polyurethane or the like, for example, having literally thousands of interconnecting cells some of which are indicated at 22. An open celled resilient pad 20 is secured to the underside of the plate 14 which comprises a gripper pad mounting means. As seen best in FIGURES 2 and 3, to the underside of a plate 24 by means of the headed fasteners 16 which pass up through suitable apertures in the plates 14 and 24 and are removably secured thereto such as by nuts 26 threadably received on the fasteners 16. It will therefore be seen that the plate 14 is acted upon by atmospheric pressure to cause the device 10 to grip a surface.

The vacuum lifting device 10 further includes a compressible border means indicated generally at 30 supported by the plate 24 such as formed of a relatively resilient compressible rubber or the like, such as a synthetic sponge rubber either with or without interconnecting cells for reasons which will become apparent hereinafter. The evacuation means defined by the compressible border means 30 is provided with a peripheral seal means indicated at 32 which in the embodiments illustrated comprises a flexible substantially fluid impermeable film such as of polyethylene terephthalate, Saran, or the like. As seen best in FIGURE 2 the impervious film 34 in its passage over the top of the plate 14 is interposed between the plate 24 and the plate 14 and it will be understood that the film 34 is in sealing relation to the fasteners 16 or any other elements passing therethrough. The impermeable film then passes downwardly and is interposed between the compressible border means 30 and the vacuum gripper pad means 18 and preferably although not necessarily is also secured to the lower depending surface of the compressible border means so as to provide a generally air-tight seal for the evacuation chamber defined by the compressible border means and the top plate 24 so as to facilitate evacuation of fluid, i.e. air, from the cells 22 of the vacuum gripper pad 20 through a fluid evacuation conduit 36 connected to a source of reduced pressure, such as a vacuum pump for example, not shown without the inrush of air into said gripper pad. To assist in the evacuation of air from the cell 22 of the vacuum gripper pad 20 the upper surface of the pad 20 adjacent the pad mounting means 14 is provided with a plurality of channels as seen in phantom lines in FIGURES 2 and 5, which channels 38 are in direct communication with the fluid evacuation conduit 36 thereby permitting more rapid evacuation of air from the cells 22 than would otherwise be possible. Although not previously indicated it will nevertheless be appreciated that the compressible border means 30 and the vacuum gripper pad means 18 are preferably secured to their respective support plates 24 and 14 by the use of suitable adhesive or the like to resist displacement of these members when forces parallel to attached surface exist.

While the embodiment of the vacuum gripper illustrated in FIGURES 1–3, 5 and 6 is generally rectangular in configuration, it will be appreciated that the gripper could be constructed in a square, round or other suitable configuration.

As will be seen from the embodiment of the invention illustrated in FIGURE 4, the compressible border means 130 is provided with a supplementary peripheral seal member 131 secured, such as by adhesive, to the underside of the flexible and permeable film 134 so as to provide a plurality of concentric sealing rings defined by the downwardly projecting ridges 133 of the seal member 131 although it will be appreciated that various other seal assist means may be utilized.

Referring now to the embodiment of the vacuum gripping device of the present invention illustrated in FIGURE 7 it will be seen that the vacuum lifting device 301 illustrated therein differs from the devices of FIGURES 1–6 in that it is primarily intended to be utilized to lift or be secured to articles and surfaces characterized by a generally convex configuration. In this regard, it will be seen that the upper plate 224 is of a generally convex-concave configuration as is its associated vacuum gripper pad mounting means 214. It will therefore be appreciated that the curved configuration of a vacuum lifting device 301 assists the compressible border means 230 in maintaining the peripheral seal provided by the film 234 against the surface to which the lifting device 301 is to be secured by differential pressure in a manner to be described hereinafter with regard to the discussion of the operation of the several embodiments of the invention illustrated herein.

Referring now to the operation of the vacuum gripping device as illustrated herein, and particularly the embodiment of the invention illustrated in FIGURES 1–3, 5 and 6 it will be seen that when the device is at rest, i.e., the air has not been evacuated from the cells 22 of the gripper pad 20 the device is of the configuration shown in FIGURE 2 wherein the generally planar undersurface thereof is in contact with, but not secured, to the planar surface of an article to be lifted or to which the device 10 is to be secured so as to provide a support means for some utilitarian device. As air from within the cells 22 is evacuated by a suitable evacuation means through the fluid evacuation conduit 36 the differential pressure induced between the pressure within the evacuation chamber means defined by the peripheral border means 30 and that exerted on the plate 24 and thus plate 14 forces the vacuum gripping device against the surface of the article thereby creating a "vacuum" grip thereon. In doing so, it will be appreciated that the open celled compressible gripper pad 20, which at rest contains a significant proportion of open voids or cells 22, compresses to the near solid state as seen in FIGURE 3 due to evacuation of the cells 22 and subsequent collapse thereof due to the differential pressure as previously discussed. Thus it will be appreciated that in the secured position shown in FIGURE 3 the vacuum lifting device 10, and particularly evacuation chamber means defined by the peripheral border 30, are substantially solid so as to provide a relatively rigid attachment. As seen in FIGURE 3 the flexible impermeable film 32 in following the gripper pad 20 will generally fold back upon itself as indicated at 35. Upon allowing air ambient pressure to enter the conduit 36 the cells 22 of the gripper pad 20 will be pressurized and the vacuum lifting device 10 will return from the configuration of FIGURE 3 to that of FIGURE 2 and the differential pressure, or "vacuum" grip on the article will thus be released.

The operation of the devices of FIGURES 4 and 7 are substantially identical to that discussed with regard to the operation of the embodiment of FIGURES 1–3, 5 and 6 which embodiments of FIGURES 4 and 7 are illustrated in the secured position, i.e. wherein the air within the cells of the respective gripper pads 120 and 220 has been evacuated so as to secure the vacuum lifting devices 201 and 301 to a surface which in the case of the embodiment of FIGURE 4 is planar and in the case of the embodiment of FIGURE 7 which is generally a convex surface.

From the foregoing, it will be appreciated that the present invention provides an improved construction for a vacuum gripping device in which the chamber to be evacuated is filled with an open-celled foam type resilient material which material is peripherally sealed by an impermeable film thereabout whereby evacuation of the cavity compresses the open cell foam material to a substantially solid state thereby providing a vacuum gripping pad comprising a generally rigid means of attachment to a generally non-porous surface of either regular or irregular configuration.

The foregoing is considered as illustrative only of the principles of the invention. Further, since numerous modifications and changes will readily occur to those skilled in the art, it is not desired to limit the invention to the exact method, operation and product shown and described, and accordingly all suitable modifications and equivalents may be resorted to falling within the scope of the invention as claimed.

What is claimed as new is as follows:

1. A vacuum gripping device and the like comprising a relatively rigid base plate means, a peripheral compressible border means secured to and projecting normal to one side of said base plate means so as to define an evacuation chamber means, a resilient cellular vacuum gripper pad means carried by said base plate means and generally normally filling said evacuation chamber means, the cells of said vacuum gripper pad means being interconnected so as to permit evacuation of substantially all cells within the vacuum gripper pad means by the application of a fluid evacuating means to a portion of said vacuum gripper pad means, peripheral seal means for said vacuum gripper pad means generally interposed between said compressible border means, said base plate means and said vacuum gripper pad means so as to substantially preclude the passage of pressure-equalizing air into said evacuation chamber means through said compressible border means and base plate means, fastening means carried by said plate means whereby said vacuum gripping device may be secured to an external motivating means and vacuum gripping pad cell evacuation means adapted to be connected to a source of reduced pressure whereby fluid within the cells may be evacuated so as to removably secure the vacuum gripping device to a support surface by means of differential pressure acting thereon.

2. The combination of claim 1 wherein a portion of said peripheral seal means extends over the peripheral compressible border means so as to cover the surface distal to said base plate means whereby the peripheral seal means covering the distal end will normally be interposed between the compressible border and the surface to which said vacuum gripping device is secured.

3. The combination of claim 2 wherein said portion of said flexible and permeable seal contiguous with the distal portion of said peripheral border means is provided with an auxiliary downwardly depending resilient seal means.

4. The combination of claim 3 wherein said downwardly projecting seal means comprises a concentrically ribbed seal so as to provide a plurality of concentric rings of sealing contact of the peripheral border with the surface to which said vacuum gripping device is to be secured.

5. The combination of claim 1 wherein said open celled foam material is secured to said base plate means by a relatively rigid plate, and said open cell foam material is secured to said plate by means of adhesive and the like.

6. The combination of claim 1 wherein said vacuum gripper pad means contiguous with said evacuation means is provided with evacuation channel means in communication with said evacuation means whereby evacuation of fluid from said connecting cells is facilitated.

7. The combination of claim 1 wherein the attaching face of said vacuum gripping device is generally planar.

8. The combination of claim 1 wherein the attaching face of said vacuum gripping device is non-planar.

9. The combination of claim 1 wherein said fastening means carried by said base plate means comprises upwardly projecting threaded fastening means whereby said vacuum gripping device may be secured to a lift means and the like.

10. The combination of claim 1 wherein said evacuating means includes a fluid evacuation conduit in communication with said open cell foam material and said evacuation conduit sealingly passes through said base plate means so as to be in communication with the open cells of said open cell foam material.

11. In a vacuum gripping device and the like adapted to be secured to an external force for manipulating the device and having an evacuation chamber provided with an evacuation conduit means to be placed in communication with a means of evacuating fluid from the evacuation chamber the improvement comprising filling said evacuation chamber with an open celled flexible foam material whereby evacuation of fluid from within the open celled foam will cause a compression of the foam material to an almost solid state thereby providing a generally rigid attachment of the gripping device to a surface, said open celled flexible foam material being provided with a fluid evacuation enhancing channel means communicating areas of the foam material remote from the evacuation conduit means directly with the evacuation conduit whereby rapid, even evacuation of the open celled foam material may be achieved.

References Cited

UNITED STATES PATENTS 2,956,769  10/1960  Sigler et al. _____ 294—64
3,321,889   5/1967  Zubik et al. _____ 294—64

EDWARD A. SROKA, *Primary Examiner.*

EVON C. BLUNK, *Examiner.*

R. D. GUIOD, *Assistant Examiner.*